(12) United States Patent
Perori et al.

(10) Patent No.: US 8,110,008 B2
(45) Date of Patent: Feb. 7, 2012

(54) SECURE PAPER COMPRISING A FIBER LAYER AND AN ELECTRONIC CHIP

(75) Inventors: Paolo Perori, Lomagna (IT); Frederic Vicentini, Sucy en Brie (FR); Dayton Marcucci, Pozzuoli (IT); Pierre Doublet, Saint-Brice (FR)

(73) Assignee: Arjowiggins Security, Issy les Moulineaux (FR)

( * ) Notice: Subject to any disclaimer, the term of this patent is extended or adjusted under 35 U.S.C. 154(b) by 1315 days.

(21) Appl. No.: 10/570,656

(22) PCT Filed: Sep. 9, 2004

(86) PCT No.: PCT/FR2004/050418
§ 371 (c)(1),
(2), (4) Date: Dec. 26, 2006

(87) PCT Pub. No.: WO2005/027033
PCT Pub. Date: Mar. 24, 2005

(65) Prior Publication Data
US 2008/0273701 A1    Nov. 6, 2008

(30) Foreign Application Priority Data

Sep. 12, 2003 (FR) .................................. 03 10745

(51) Int. Cl.
*G06F 1/26* (2006.01)
(52) U.S. Cl. ................ 726/35; 726/2; 726/26; 162/106; 162/138; 162/140; 713/189; 713/193; 713/194
(58) Field of Classification Search ................. 726/2, 26, 726/35; 162/106, 138, 140; 713/189, 193, 713/194
See application file for complete search history.

(56) References Cited

U.S. PATENT DOCUMENTS

| 7,170,391 | B2 * | 1/2007 | Lane et al. ................... 340/5.82 |
| 7,353,400 | B1 * | 4/2008 | Folmsbee ...................... 713/190 |
| 2002/0199111 | A1 * | 12/2002 | Clark et al. .................... 713/194 |
| 2003/0177363 | A1 * | 9/2003 | Yokota et al. ................. 713/176 |

FOREIGN PATENT DOCUMENTS

| EP | 0 964 361 A1 | 12/1999 |
| EP | 0 964 361 A1 | 12/1999 |
| WO | WO 01/50530 A1 | 7/2001 |
| WO | WO 03/005143 A2 | 1/2003 |
| WO | WO 2005/027033 A2 | 3/2005 |

* cited by examiner

*Primary Examiner* — Edan Orgad
*Assistant Examiner* — Roderick Tolentino
(74) *Attorney, Agent, or Firm* — Oliff & Berridge, PLC

(57) ABSTRACT

The present invention relates to secure paper (1), characterized by the fact that it comprises:
- at least one fiber layer (2); and
- at least one electronic chip (3) integrated in the fiber layer (2), said chip (3) including a memory (10) in which at least a first key is stored for use in authenticating the secure paper;
- the chip being configured to spoil, and in particular to delete, the first key in the event of an attempt at forced access to the chip, so as to make it impossible subsequently to authenticate the secure paper (1).

17 Claims, 2 Drawing Sheets

SECURE PAPER COMPRISING A FIBER LAYER AND AN ELECTRONIC CHIP

The present invention relates in particular to secure paper comprising a fiber layer and an electronic chip integrated in the fiber layer.

International patent application WO 03/015016 in the name of the Applicant discloses such secure paper.

There exists a need to improve the security of such secure paper, e.g. in order to make it impossible to copy the data contained in the chip.

The invention thus provides secure paper, characterized by the fact that it comprises:
- at least one fiber layer; and
- at least one electronic chip integrated in the fiber layer, said chip including a memory in which at least a first key, also referred to as the "diversified" keys, is stored for use in authenticating the secure paper;
- the chip being configured to spoil, and in particular to delete, the first key in the event of an attempt at forced access to the chip, so as to make it impossible subsequently to authenticate the secure paper.

The term "electronic chip" designates any type of integrated circuit electronic component, such as a microprocessor or a memory.

The term "attempt at forced access to the chip" designates any attempt at reading or manipulating protected data contained therein, by means of a device external to the chip, and in particular a reader.

By means of the invention, since the first key is spoilt in the event of an attempt at forced access to the chip, even a copy of some of the data contained in the chip does not suffice for making a true copy of the secure paper. In the absence of the first key, the copy cannot be authenticated.

In an embodiment of the invention, the memory includes a first zone suitable for storing data without it being possible for that data to be read by a reader device external to the chip, and the first key is stored in said first zone.

The memory may also include a second zone suitable for storing data that can be read by a reader device external to the chip and an identifier associated with the paper can be stored in this second zone.

The first key is preferably generated by encrypting the above-mentioned identifier by using a second key, also referred to as the "master" key, using a first algorithm, also referred to as the "diversification" algorithm.

The first and second memory zones preferably store data without being able to modify it.

In an embodiment of the invention, the chip contains a program configured to execute a second algorithm, also referred to as the "authentication" algorithm, this algorithm enabling a response to be generated by encrypting a random number issued by an authentication device and received by the chip, the encryption making use of the first key.

In other words, the secure paper is authenticated using a response that can change from one authentication operation to another, because on each occasion it is a random number that is encrypted.

Thus, for authentication purposes, there is no need to transmit protected data directly, which means that it can be made impossible for the protected data to be copied.

The electronic chip may be configured in particular in such a manner that the first key is not transmitted during an authentication operation.

The chip preferably includes an antenna enabling data to be transmitted without contact.

The antenna is advantageously made by etching the medium of the chip, in particular a silicon medium.

The paper may include a coupling antenna distinct from the antenna of the chip and inductively coupled thereto without there being physical contact between the antennas.

In an embodiment of the invention, the chip is integrated in the fiber layer without that leading to extra thickness.

The chip may be secured to a flexible support of elongate shape, and this support may be coated on both faces in a heat-sealable varnish.

In an embodiment of the invention, the support extends between two opposite edges of the article.

The secure paper may include an authentication element distinct from the chip and, for example, selected from: components that are magnetic, optically variable, in particular depending on the angle of observation, opaque, or visible in transmission, light emitting or fluorescent under visible, ultraviolet, or infrared light, and in particular near infrared light, and biomarkers, this list not being limiting.

The secure paper may constitute a bank note.

In general, the secure paper may constitute any security document, such as a passport, a label, a ticket, a voucher, a payment medium, an envelope, trademark protection, or a traceability or authentication or identity document.

The invention also provides a device for authenticating secure paper, the device comprising:
- an antenna for exchanging data with the chip of the secure paper; and
- a first circuit configured to enable a first response to be generated as a function of an identifier emitted by the chip of the secure paper and to compare said first response with a second response emitted by the chip of the secure paper, in order to authenticate the secure paper.

In an embodiment of the invention, the authentication device includes a second circuit configured to read the identifier of the secure paper and to generate a random number.

The first circuit may contain a second key, also referred to as a "master" key, and a program configured to execute a first algorithm, also referred to as a "diversification" algorithm, this algorithm enabling the first key to be generated, also referred to as the "diversified" key, by encrypting the identifier issued by the chip of the secure paper, making use of the second key, the first algorithm and the second key being respectively identical to the first algorithm and to the second key used for generating the first key of the chip of the secure paper.

The first circuit may include a memory with a zone storing data that cannot be read by a reader device external to the authentication device, said memory containing the second key.

Preferably, the first circuit includes a program configured to execute a second algorithm, also referred to as the "authentication" algorithm, identical to that used by the chip of the secure paper and enabling a first response to be generated by using the first key to encrypt a random number.

Thus, on comparing the first response with the second response emitted by the chip, the first circuit can determine whether the secure paper is authentic.

The invention can be better understood on reading the following detailed description of a non-limiting embodiment of the invention, and on examining the accompanying drawings, in which:

FIG. 1 shows secure paper 1 in accordance with the invention constituting a bank note.

Figure 1:
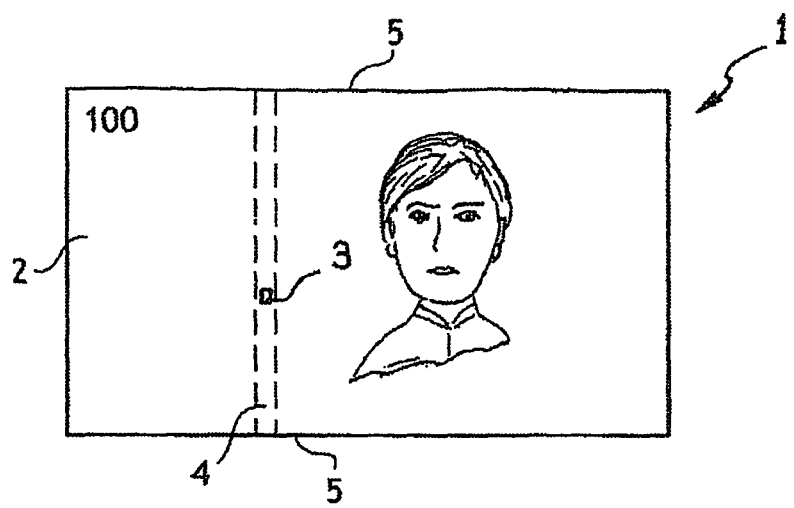
FIG. 1 is a diagrammatic and fragmentary view of secure paper in accordance with the invention.
Figure 2:
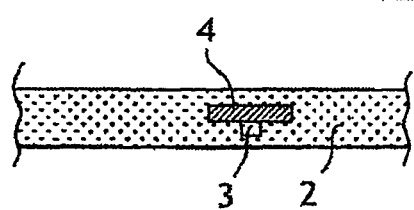
FIG. 2 is a diagrammatic and fragmentary cross-section view of the FIG. 1 secure paper.

The secure paper 1 comprises a fiber layer 2 having an electronic chip 3 integrated therein, the chip being carried on a support 4 of elongate shape, as shown in particular in FIG. 2.

The support 4 extends between two opposite edges 5 of the secure paper 1.

The secure paper 1 is manufactured as follows.

The fiber layer 2 is obtained in a machine that includes a vat containing a suspension of fibers with a rotary cloth cylinder being partially immersed therein to define a surface, with the fiber layer 2 being formed continuously on coming into contact therewith.

During its formation, an elongate support 4 is incorporated in the fiber layer 2, the support being constituted by a strip carrying a plurality of electronic chips 3 disposed at regular intervals on one of its faces.

The strip or tape 4 is of relatively narrow width, lying in particular in the range 1 millimeter (mm) to 10 mm, e.g. in the range 2 mm to 4 mm.

The strip 4 is obtained in the following manner.

Electronic chips 3 are bonded to a polyester film by means of an epoxy, a cyanoacrylate, or an isocyanate adhesive, the thickness of the polyester, lying for example, in the range 12 micrometers (µm) to 80 µm, and in particular in the range 12 µm to 40 µm.

A hot-setting varnish is optionally deposited to reinforce bonding in the fiber layer 2.

It is possible to use a varnish that becomes active at a temperature lying in the range 70° C. to 130° C., for example.

The chip 3 may be completely embedded in the mass of the fiber layer 2 so that the chip 3 is not detectable visually or to the touch, and does not lead to extra thickness.

In a variant, the chip 3 may be embedded in part only in the mass of the fiber layer 2.

In an embodiment that is not shown, the chip 3 could be placed in a cavity in the fiber layer.

A fiber layer that is not shown, but that is distinct from the layer 2 in which the electronic chip is integrated, may optionally be assembled together with said layer.

Reference can be made to international application WO 03/015016 in the name of the Applicant for the method of fabricating such secure paper 1.

Figure 3:
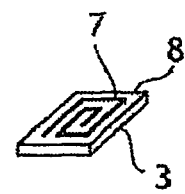
FIG. 3 is a diagrammatic and fragmentary view of a chip integrated in the FIG. 1 secure paper.

As can be seen in FIG. 3, the chip 3 has an antenna 7 enabling data to be transmitted without contact, which antenna 7 is made by etching the silicon medium 8 of the chip 3.

The antenna 7 may be inductively coupled to a coupling antenna (not shown), without physical contact between the antennas, thus enabling the data interchange range to be extended.

The coupling antenna can be made on the fiber layer 2 by printing or by rolling, for example.

In a variant, the coupling antenna can be made on a substrate different from the fiber layer 2, which substrate is laminated with the fiber layer.

In another variant, the coupling antenna can be made on the strip 4, e.g. by etching a copper or aluminum surface, by metallization, or by silk-screen printing.

In order to ensure that the chip 3 is accurately positioned relative to the fiber layer 2, it is possible to place identifier marks on the fiber layer 2 and the strip 4.

Figure 4:
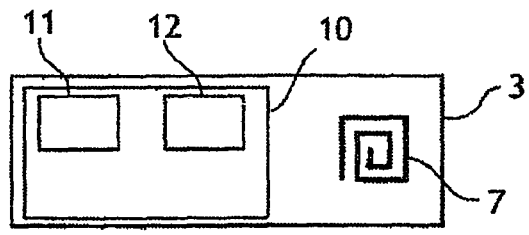
FIG. 4 is a fragmentary block diagram of the FIG. 3 chip.

As shown by the block diagram of FIG. 4, the chip 3 includes a memory 10 having a first zone 11 suitable for storing data without there being any possibility for said data to be read by a reader device external to the chip 3, and a second zone 12 suitable for storing data that can be read by a reader device external to the chip 3.

In normal operation, the first and second memory zones 11 and 12 store data without it being possible to modify the data.

The memory zone 11 stores the first key $K_{SAT}$ serving to authenticate the secure paper 1, as explained below.

The second zone 12 stores an identifier SID associated with the secure paper 1.

Figure 6:
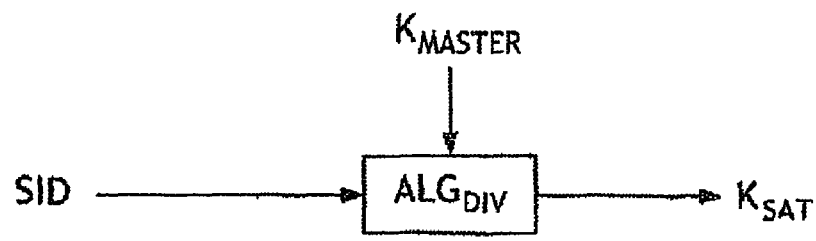
FIGS. 6 to 8 are diagrams showing various encryption and authentication operations with secure paper and an authentication device of the invention.

In the example described, the first key $K_{SAT}$ is generated by encrypting the identifier SID using a second key $K_{MASTER}$ by executing a first algorithm $ALG_{DIV}$, as shown diagrammatically in FIG. 6.

Initially, the memory 10 of the chip 3 is freely accessible for reading and writing.

Once the chip 3 has been integrated in the fiber layer 2 during fabrication of the secure paper 1, access to the memory 10 of the chip 3 can be protected by a confidential transport code TSC.

In order to write the first key $K_{SAT}$ in the first memory zone 11 and the identifier SID in the second memory zone 12, it is necessary to provide the code TSC.

After writing this data in the memory 10, it is no longer possible to change the data, with the above-mentioned operations taking place in irreversible manner.

The chip 3 is configured so that in the event of an attempt at forced access to the chip 3, it automatically spoils, and in particular deletes, the first key $K_{SAT}$, thus preventing any subsequent authentication of the secure paper 1.

Figure 7:
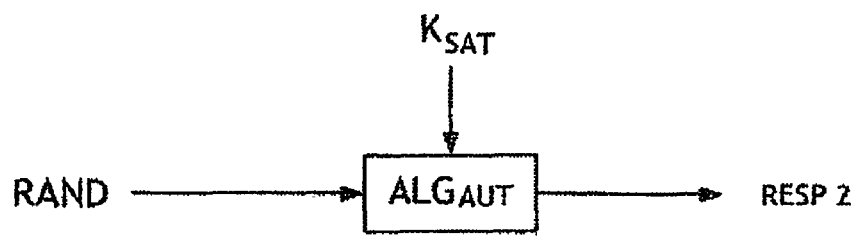

The chip 3 contains a program enabling a second algorithm $ALT_{AUT}$ to be executed that serves to generate a response RESP2 by encrypting a random number RAND issued by an authentication device and received by the chip, the encrypting making use of the first key $K_{SAT}$ as shown in FIG. 7.

The first and second algorithms $ALG_{DIV}$ and $ALG_{AUT}$ are peer reviewed certified symmetrical encryption algorithms.

These algorithms $ALG_{DIV}$ and $ALG_{AUT}$ are configured to make it possible to reconstitute the second key $K_{MASTER}$ either from the first key $K_{SAT}$ on the basis of a data pair comprising a first key $K_{SAT}$ and an identifier SID, or from a data pair comprising a response RESP2 and a random number RAND.

Figure 5:
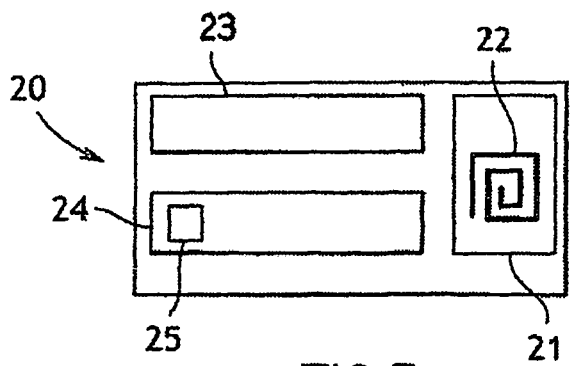
FIG. 5 is a fragmentary block diagram of an authentication device in accordance with the invention.

The secure paper 1 is authenticated by an authentication device 20 shown highly diagrammatically in FIG. 5, and comprising:

a coupler 21 with an antenna 22 enabling data to be exchanged, in particular at radio frequencies (RF), with secure paper 1;

a first circuit 23 in an authentication module; and a second circuit 24 in a microcontroller.

The second circuit 24 is configured to read the identifier SID of the secure paper 1 and to generate a random number RAND.

The first circuit 23 which is configured to be protected in the event of an attempt at forced access, includes a memory 25 storing data without it being possible for it to be read by a reader device external to the module.

The memory 25 contains a second key $K_{MASTER}$.

The first circuit 23 contains a first program configured to execute a first algorithm $ALG_{DIV}$ enabling the first key $K_{SAT}$ to be generated by making use of the second key $K_{MASTER}$ to encrypt the identifier SID issued by the chip 3 of the secure paper, the first algorithm $ALG_{DIV}$ and the second key $K_{MASTER}$ being respectively identical to the algorithm $ALG_{DIV}$ and to the key $K_{MASTER}$ used for generating the key $K_{SAT}$ of the chip 3.

The first circuit 23 contains a second program configured to execute a second algorithm $ALG_{AUT}$ identical to that of the chip 3 of the secure paper, configured to generate a response RESP1 by making use of the first key $K_{SAT}$ to encrypt a random number RAND issued by the second circuit 24.

The first circuit 23 is configured to compare a first response RESP1 obtained thereby with a second response RESP2 issued by the chip 3 of the secure paper.

The secure paper 1 is authenticated as follows.

On bringing the secure paper 1 close enough to the authentication device 20, it is possible using the second circuit 24 to read the identifier SID of the secure paper 1 and to generate a random number RAND.

Figure 8:
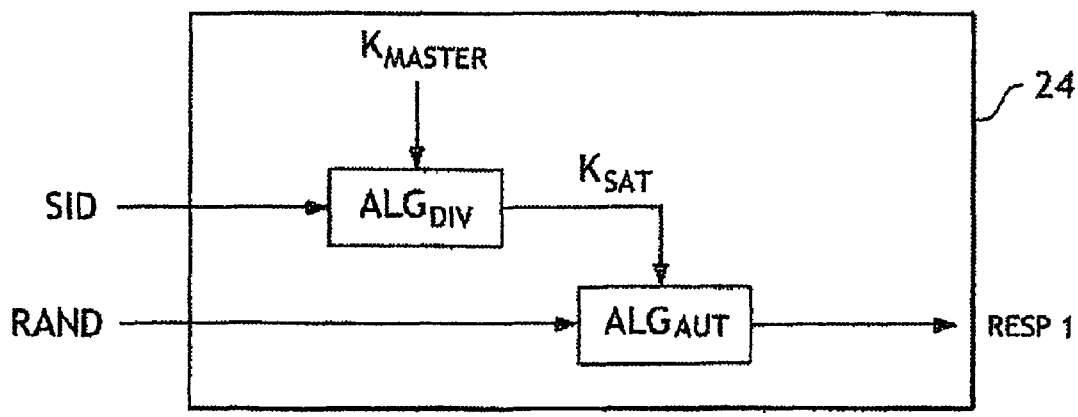

The identifier SID and the random number RAND are used by the first circuit 23 to generate a response RESP1, as shown in FIG. 8.

The second circuit 24 sends the random number RAND to the chip 3 of the secure paper 1 which makes use of the algorithm $ALG_{AUT}$ to generate a response RESP2.

The first circuit 23 then compares the response RESP1 with the response RESP2 received from the chip of the secure paper.

If RESP1 is not equal to RESP2, then the authentication device 2 issues information to the effect that the secure paper 1 is not authentic.

Otherwise, the authentication device 20 issues information to the effect that the secure paper 1 is authentic.

Naturally, the invention is not limited to the embodiment described above.

The chip of the secure paper may in particular contain data such as a serial number, a country code, a name, an issuing year, which data can be read by a reader device external to the chip.

The invention claimed is:

1. Secure paper, comprising:
    at least one fiber layer; and
    at least one electronic chip integrated in the fiber layer, said chip including a memory in which at least a first key is stored for use in authenticating the secure paper;
    the chip being configured to spoil the first key in the event of an attempt at forced access to the chip, so as to make it impossible subsequently to authenticate the secure paper, wherein
    the memory comprises a first zone suitable for storing data without any possibility of the data being read by a reader device external to the chip, and wherein the first key is stored in the first zone, and
    the memory comprises a second zone suitable for storing data that can be read by the reader device external to the chip, and wherein
    an identifier associated with the paper is stored in the second zone,
    the first key is generated by encrypting said identifier by using a second key, with the help of an algorithm, and
    the chip contains a program configured to execute a second algorithm, the second algorithm enabling a response to be generated by making use of the first key to encrypt a random number issued by an authentication device and received by the chip.

2. Paper according to claim 1, wherein the memory zones store data without it being possible to modify the data.

3. Paper according to claim 1, wherein the chip comprises an antenna enabling data to be transmitted without contact.

4. Paper according to claim 3, wherein the antenna is made by etching a support of the chip.

5. Paper according to claim 3, comprising a coupling antenna, distinct from the antenna on the chip, and inductively coupled thereto, without physical contact between the antennas.

6. Paper according to claim 1, wherein the chip is integrated in the fiber layer without extra thickness.

7. Paper according to claim 1, wherein the chip is secured to a flexible support of elongate shape.

8. Paper according to claim 7, wherein the support is coated on both faces in a hot-setting varnish.

9. Paper according to claim 7, wherein the support extends between two opposite edges of the article.

10. Paper according to claim 1, comprising an authentication element distinct from the chip.

11. Paper according to claim 1, forming a bank note.

12. Paper according to claim 1, wherein the chip is configured to delete the first key in the event of an attempt at forced access to the chip.

13. Paper according to claim 10, wherein said authentication element is selected from: components that are magnetic, optically variable, in particular depending on the angle of observation, opaque, or visible in transmission, light emitting or fluorescent under visible, ultraviolet, or infrared light, and in particular near infrared light, and biomarkers.

14. A method for authenticating a secure paper wherein the secure paper comprises at least one fiber layer; at least one electronic chip integrated in the fiber layer, said chip including a memory in which at least a first key is stored for use in authenticating the secure paper; the chip being configured to spoil the first key in the event of an attempt at forced access to the chip, so as to make it impossible subsequently to authenticate the secure paper, wherein the memory comprises a first zone suitable for storing data without any possibility of the data being read by a reader device external to the chip, and wherein the first key is stored in the first zone, and the memory comprises a second zone suitable for storing data that can be read by the reader device external to the chip, and wherein an identifier associated with the paper is stored in the second zone, the first key is generated by encrypting said identifier by using a second key, with the help of an algorithm, and the chip contains a program configured to execute a second algorithm, the second algorithm enabling a response to be generated by making use of the first key to encrypt a random number issued by an authentication device and received by the chip, the method comprising: exchanging data between the chip of the secure paper and an antenna of an authentication device; generating a first response as a function of an identifier issued by the chip of the secure paper with a first circuit of said authentication device, and comparing said first response with a second response issued by the chip of the secure paper in order to authenticate the secure paper; and reading the identifier of the secure paper and generating a random number with a second circuit of said authentication device.

15. A method according to claim 14, wherein the first circuit comprises a second key and a program configured to execute a first algorithm and enabling a first key to be generated by making use of the second key to encrypt the identifier issued by the chip of the secure paper, the first algorithm and said second key being identical respectively to the first algorithm and to the second key that was used for generating the first key of the chip of the secure paper.

16. A method according to claim 15, wherein the first circuit comprises a memory suitable for storing data without it being possible for the data to be read by a reader device external to the authentication device, said memory containing the second key.

17. A method according to claim 15, wherein the first circuit comprises a program configured to execute a second algorithm identical to that used by the chip of the secure paper and enabling data to be generated in response by making use of the first key to encrypt a random number.

* * * * *